United States Patent [19]

Fukumoto et al.

[11] Patent Number: 5,131,446

[45] Date of Patent: Jul. 21, 1992

[54] PNEUMATIC RADIAL TIRE FOR HEAVY LOADS, INCLUDING FOUR METAL CORD BELT PLIES

[75] Inventors: Tetsuhiro Fukumoto; Kiyoshi Ochiai, both of Kobe; Midori Inaoka, Nishinomiya; Akihiro Takeuchi, Kobe, all of Japan

[73] Assignee: Sumitomo Rubber Industries, Ltd., Kyogo, Japan

[21] Appl. No.: 507,794

[22] Filed: Apr. 12, 1990

Related U.S. Application Data

[63] Continuation-in-part of Ser. No. 183,093, Apr. 18, 1988, abandoned.

[30] Foreign Application Priority Data

Nov. 27, 1987 [JP] Japan .................. 62-300656

[51] Int. Cl.⁵ .................. B60C 9/28; B60C 9/20; B60C 9/18
[52] U.S. Cl. .................. 152/532; 152/454; 152/526; 152/535; 152/538
[58] Field of Search .............. 152/454, 526, 532, 535, 152/537, 538

[56] References Cited

U.S. PATENT DOCUMENTS

| | | | |
|---|---|---|---|
| 4,037,637 | 7/1977 | Arimura et al. | 152/454 |
| 4,082,132 | 4/1978 | Arai et al. | 152/454 X |
| 4,696,335 | 9/1987 | Tsukagoshi et al. | 152/526 X |
| 4,962,804 | 10/1990 | Veda et al. | 152/454 |
| 5,042,546 | 8/1991 | Forney et al. | 152/454 |
| 5,052,457 | 10/1991 | Iida et al. | 152/454 |

FOREIGN PATENT DOCUMENTS

| | | | |
|---|---|---|---|
| 62-244702 | 10/1987 | Japan | 152/532 |
| 63-166605 | 7/1988 | Japan | 152/538 |

Primary Examiner—Michael W. Ball
Assistant Examiner—Adrienne C. Johnston
Attorney, Agent, or Firm—Birch, Stewart, Kolasch & Birch

[57] ABSTRACT

A radial tire is comprised of a belt, disposed between a carcass and a tread, having metal cord plies including a first belt ply, a second belt ply, a third belt ply and a fourth belt ply which are arranged radially outwardly in that order, wherein the second belt ply has a curvature concentric with the curvature of a radially outer surface of the tread and a width (B2) of at least 93% of the tread width (W), and the third belt ply has a width (B3) smaller than the width (B2) and is provided at both ends with spaced parts 1.5 to 4.5 mm distance apart from the second belt ply, the third belt ply, in a central part having a width (CR) of 60 to 70% of the width (B3) and both end parts each having a width (b) of 5 to 15% of the width, the third belt ply having a curvature concentric with the curvature of the radially outer surface of the tread.

8 Claims, 4 Drawing Sheets

PNEUMATIC RADIAL TIRE FOR HEAVY LOADS, INCLUDING FOUR METAL CORD BELT PLIES

This is a continuation-in-part of U.S. application Ser. No. 07/183,093, filed Apr. 19, 1988, now abandoned.

BACKGROUND OF THE INVENTION

The present invention relates to a pneumatic radial tire for heavy loads, and more particularly to an improvement upon tread reinforcement to prevent structural failure and to diminish uneven wear of the tread.

In general, for pneumatic radial tires used for heavy loads for trucks and buses, there has been widely used the so-called steel radial ply tire. Such a tire comprises a carcass of radially arranged steel cords with the ends turned up around bead cores and a belt composed of 3 or 5 belt plies arranged on the crown of the carcass. Structural failure of the carcass and that of the bead was greatly decreased by improvement upon the carcass and bead structures, and the tires became used under more severe conditions such as higher speed and heavier loads.

Accordingly, with tires for heavy loads used under such conditions, inasmuch as its ground contacting pressure is much higher than that of passenger care tires, the so-called shoulder wear—uneven wear in which the edge part of the tread is greatly worn by slip against the road surface—is liable to be caused by the uneven rigidity of the tread and also by the difference between the diameters of the central part and the edge part of the tread.

Furthermore, due to the heat and strain generated by the tire rotation, the so-called tread separation—structural damage caused by an adhesive failure between the belt cords and rubber expanding from the belt ends of the third belt ply—is liable to result.

SUMMARY OF THE INVENTION

It is therefore, an object of the present invention to provide a pneumatic radial tire for heavy loads which solves the above-mentioned problems of shoulder wear and tread separation without sacrificing other required characteristics.

According to one aspect of the present invention, a pneumatic radial tire for heavy loads is provided which comprises:

a carcass, extending between beads of the tire, and having cords arranged at an angle of from 0 to 30 degrees with respect to the radial direction of the tire;

a tread on the carcass; and a belt, for stiff reinforcement beneath the tread, disposed on a crown of the carcass, having metal cord plies including a first belt ply, a second belt ply, a third belt ply and a fourth belt ply which are arranged radially outwardly in that order, characterized in that the second belt ply, has a curvature concentric with the curvature of a radially outer surface of the tread, and has a width (B2) of at least 93% of the tread width (W); and the third belt ply, has a width (B3) smaller than the width (B2) of the second belt ply, both ends thereof provided with spaced parts 1.5 to 4.5 mm distance apart from the second belt ply; the third belt ply, having a central part with a width (CR) of 60 to 70% of the width (B3) of the third belt ply, both end parts thereof each having a width (b) of from 5 to 15% of the width (B3) of the third belt ply, the third belt ply having a curvature concentric with the curvature of the radial outer surface of the tread.

Among the four plies of the belt, the first to third belt plies on the carcass side serve as a hoop, and the fourth belt ply nearest to the ground contacting surface plays mainly a role for protecting the first to third belt plies from external wounds.

Since the second belt ply, which is positioned in between the three belt plies having the hoop effect, is formed into a circular arc concentric with the curvature of the radial outer profile of the tread surface over the entire width, the second belt ply, when the tread contacts the ground, becomes parallel to the ground in that section of the tire, whereby uniformity of the rigidity provided on the tread by the above-mentioned three belt plies with the hoop effect is improved. Accordingly, the ground contacting pressure under heavy loads is unified and uneven wear of the tread is decreased. With regard to this, the width of the second belt ply should be at least 93% of the tread width under a standard load.

Incidentally, the uniformity would be well maintained, if the distance lo between the tread surface and the second belt ply along the normal line from any point on the tread surface to the second belt ply, is in the range of lo $\pm 1.0$ mm, wherein lo is a distance along the center line (CL).

Generally, the heat generated in the tread rubber while the tire is in rotation becomes a main cause of tread separation owing to a tendency to cause adhesive failure between the belt cords and rubber in the belt ends of the third belt ply. The resistance to such tread separation shows a reverse correlation with the temperature of the belt ends of the third belt ply, and the resistance decreases as the temperature increases and the temperature of the belt ends of the third belt ply shows a positive correlation with the distance (B) thereof from the tread surface, as shown in FIG. 4, which shows a distribution of the temperature when the distance B is varied, taking the distance (B) as the abscissa and the temperature at the third belt end as the ordinate.

From the above, it is understood that the shorter the distance (B) of the third belt ply ends from the tread surface, the lower the temperature, and the more preferable the situation is. But, if the distance (B) is too small, then the belt ply will come out early as the wear extends, and further the ends are too remote from the second belt ply and the above-mentioned hoop effect will be decreased.

From such a point of view, both end parts of the third belt ply must be at a distance in a range of from 1.5 to 4.5 mm from the second belt ply or 1.0 to 2.5 times the thickness of the second belt ply, and must be formed into a circular arc concentric with the outer profile of the tread. If it is smaller than 1.5 mm, the distance of the end parts from the tread surface is too large, and the tread is likely to separate due to the heat. On the contrary, if larger than 4.5 mm, there are encountered the problems of coming-out of the belt and a decrease in the hoop effect, as described above. The spaced parts of the third belt ply, reduce the interlayer strain which is apt to be caused between the ends of the second belt ply and those of the third belt ply, and have a good effect on prevention of interlayer separation. Furthermore, as the end parts of the third belt ply are formed into a circular arc concentric with the curvature of the radially outer profile of the tread, the distribution of the ground contacting pressure becomes uniform, and the stress concentration on the belt ply ends, which was observed in the conventional constructions, disappears. As a result, the durability increases.

Considering prevention of an abrupt change in rigidity in the edge portions of the belt, it is not desirable to align the ply edges of the first to third belt plies. The figures show the best arrangement wherein $B2>B1>B3$, and the difference B1-B3 should be in the range of 4 to 8 mm ($4 \leq B1-B3 \leq 8$). If the overall difference is less than 4 mm, that is, each side less than 2 mm, the edges are substantially aligned. On the contrary, if the difference is more than 8 mm, the difference in belt rigidity between the tread crown region and the tread shoulder regions becomes undesirably large.

DETAILED DESCRIPTION OF THE INVENTION

An embodiment of the present invention will now be described, by way of example only, with reference to the drawings.

Figure 1:
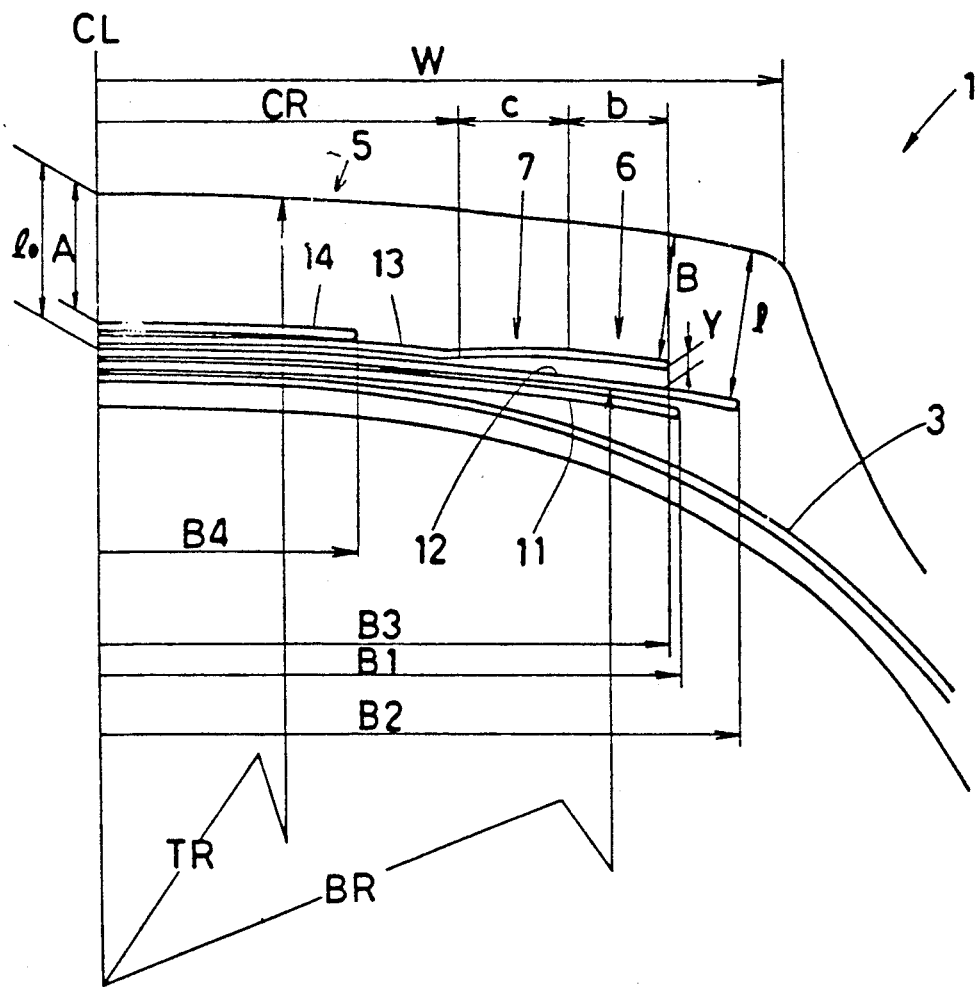
FIG. 1A is a sectional view showing an embodiment of the present invention.
FIGS. 1B and 1C are diagrammatic views showing examples of the belt end part.
Figure 1A:
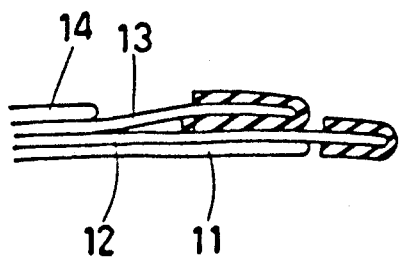

In FIG. 1, the pneumatic radial tire 1 for heavy loads is provided with the first to fourth belt plies 11, 12, 13 and 14 arranged between the carcass 3 and the tread 5 on the crown of the carcass, wherein the carcass 3 is, at both ends, turned up around a pair of bead cores disposed in the tire beads, not shown, and has metallic, organic or glass fiber cords, in this example metallic cords, arranged at an angle of 0 to 30 degrees to the radial direction of the tire.

The surface of the tread 5 is formed into an arc of a circle having a center on the center line (CL) of the tire, and the references (TR) and (W) refer to the radius of the curvature thereof and the width of the tread, respectively.

The cords of the first to fourth belt plies 11 to 14 are arranged at an angle of 10 to 70 degrees with respect to the equatorial plane of the tire so that the first belt ply cords and the second belt ply cords are laid in a direction crosswise to the third belt ply cords and the fourth belt ply cords. Each belt ply of this example is composed of steel cords, and the second belt ply 12 is widest and has a width (B2).

The second belt ply 12 is formed into a arc of a circle concentric with the tread surface, and the radius (BR) of the curvature thereof is less than the radius (TR) of the curvature of the tread surface. The second belt ply thickness ranges from 1.2 mm to 1.8 mm.

The distance lo between the tread surface and the second belt ply along the normal line from any point on the tread surface to the second belt ply, is in a range of from lo±1.0 mm, wherein lo is a distance between the tread surface to the second belt ply along the center line (CL). Accordingly, a relation: $BR = TR - lo$ comes into existence, and in a section of the tire in contact with the ground, the second belt ply 12 becomes parallel to the road surface over about the whole width thereof.

The width (B2) of the second belt ply 12 is more than 93% of the tread width (W) when the tire is subjected to the standard load, whereby the tread is increased in rigidity over the whole width. If the width (B2) is less than 93% of the tread width, the rigidity is decreased at the shoulder parts, whereby uneven wear is apt to be caused.

The first belt ply 11 is disposed closely to the radially inside of the second belt ply 12 so as to be in parallel with the tread surface. The width (B1) thereof is less than the width (B2) of the second belt ply 12, in this example about 20 mm smaller.

The third belt ply 13 is disposed radially outside the second belt ply 12, and is provided at both its ends with the spaced part 6 a certain distance (Y) apart from the second belt ply (12). As mentioned above, the distance (Y) must be in the range of from 1.5 to 4.5 mm or 1.0 to 2.5 times the second belt ply thickness.

The spaced part 6 has a width (b) of 5 to 15% of the width (B3), and is formed so as to be in parallel with the second belt ply, that is, parallel with the tread surface.

The third belt ply 13 is further provided with the slanting parts 7 of which the distance from the second belt ply gradually decreases towards the axially inside of the tire.

Therefore, the stress concentration and occurrence of a gap in the rigidity are effectively prevented. Further, since the curvature of each end part of the third belt ply is concentric with the curvature of the tread surface, the ground pressure, when loaded, is equalized even at the belt end parts, and there is prevented stress concentration on the belt end parts as in the prior art. Accordingly, the durability of the tire is increased and the tread wear is evened out.

The fourth belt ply 14 is disposed radially outside and in parallel with the third belt ply 13 to be positioned between the spaced parts 6, in this example between the slanting parts 7. The width (B4) of the fourth belt ply has the following relation:

$$B4 \leq B3 - 2(b+c)$$

wherein c is the width of the slanting part 7.

Further, the fourth belt ply 14 is formed so that the distance (A) of the fourth belt ply 14 from the tread surface equals the distance (B) of the spaced part 6 from the tread surface.

Figure 1B:
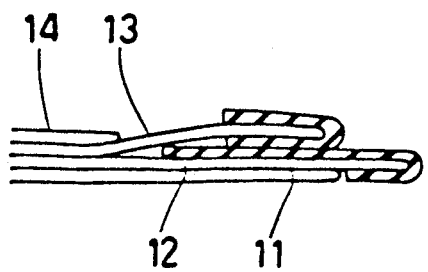

The end parts of the second belt ply 12 and the above-mentioned end parts of the third belt ply 13 are covered with rubber strips, as shown in FIGS. 1B and 1C. by this means, the resistance to separation is further increased, and the positional precision of each belt ply in the axial direction and the dimensional precision of the spaced part 6 also increase.

Considering prevention of an abrupt change in rigidity in the edge portions of the belt, it is not desirable to align the ply edges of the first to third belt plies. The figures show the best arrangement wherein $B2>B1>B3$, and the difference B1-B3 should be in the range of 4 to 8 mm ($4 \leq B1-B3 \leq 8$). If the overall difference is less than 4 mm, that is, each side less than 2 mm, the edges are substantially aligned. On the contrary, if the difference is more than 8 mm, the difference in belt rigidity between the tread crown region and the tread shoulder regions becomes undesirably large.

TEST RESULTS

Figure 2:
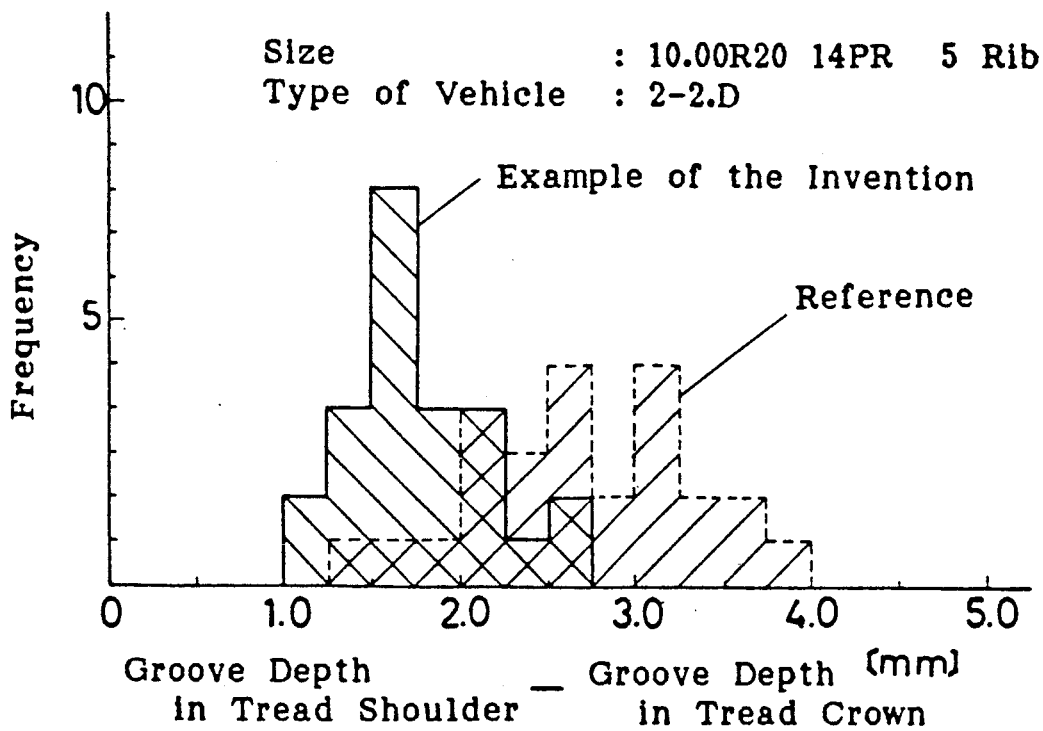
FIGS. 2 and 3 are bar graphs showing the test results.
Figure 5:
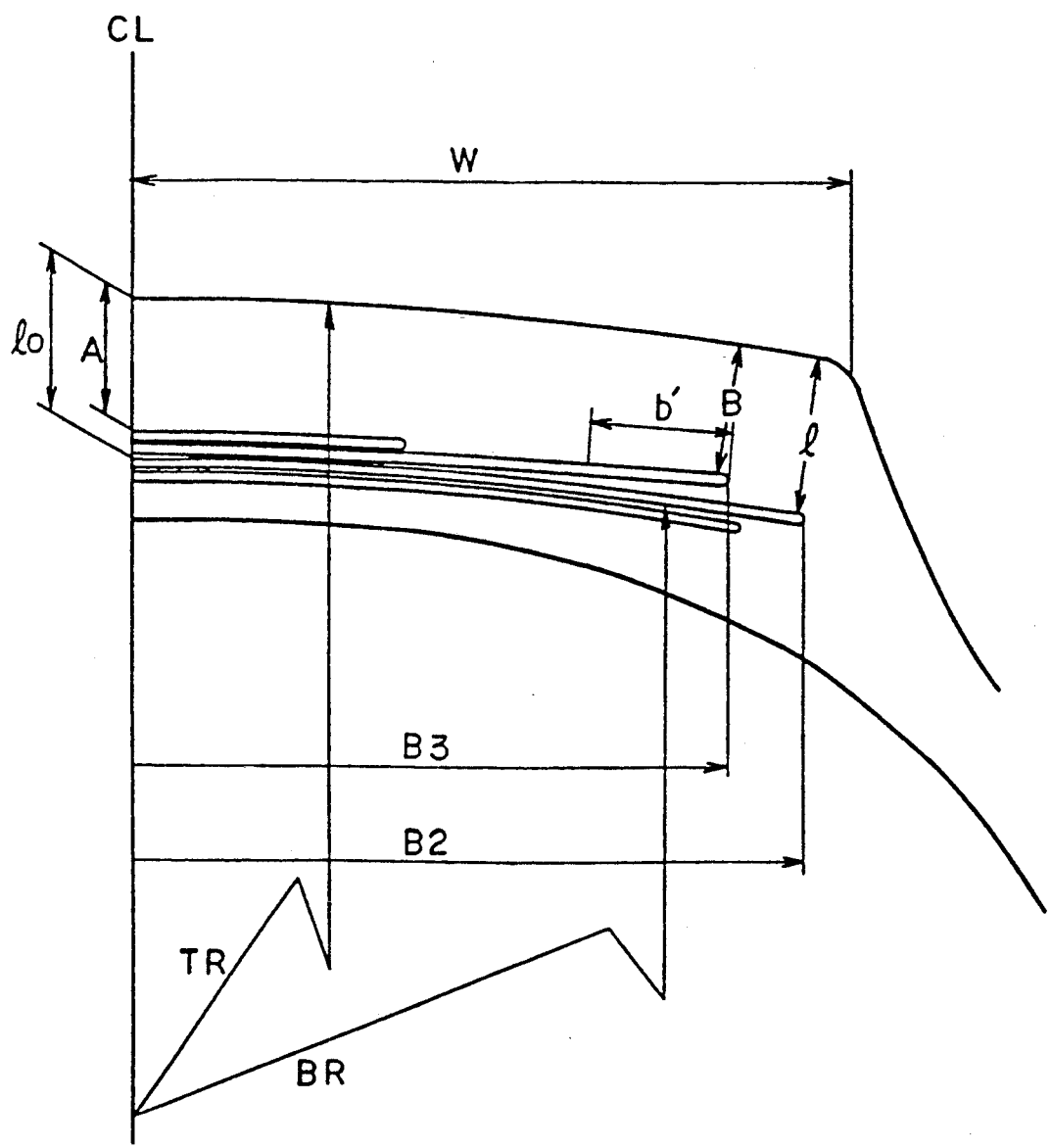
FIG. 5 is a sectional view showing a reference tire for the tests.

Various five rib pattern test tires of 10.00R 20 14PR: example tires according to the invention shown in FIG. 1 and Table 1 and reference tires shown in FIG. 5 and Table 1 were manufactured, and with respect to the difference between the depth of the grooves remaining in the tread crown and that in the tread shoulders, the test tires were evaluated by a field test by truck users. The results are shown in FIG. 2 in which the abscissa and the ordinate thereof are for the difference and the frequency, respectively. The trucks used for the field test were of a 2-2.D type and ran mostly on expressways with loads of general commodities.

TABLE 1

| Dimension (mm) | Example FIG. 1 | Reference FIG. 5 |
| --- | --- | --- |
| A | 17.9 | 17.9 |
| B | 17.9 | 17.9 |
| B2 | 182 | 182 |
| B3 | 162 | 162 |
| BR | 479 | 479 |
| TR | 500 | 500 |
| W | 194 | 194 |
| lo | 21.5 | 21.5 |
| l | 21.5 | 21.5 |
| Y | 2.5 | *1 |
| b | 20 | *1 |

Note:
[1] In the reference tire of FIG. 5, a second belt ply has a curvature concentric with curvature of a radially outer surface of a tread, and each end part (b') of a third belt ply did not have curvature concentric with the curvature of the radially outer surface of the tread.

In FIG. 2, the abscissa corresponds to the uniformity in tread wear in end of tire life, the smaller the value, the better the resistance to wear.

As apparent from FIG. 2, in the tire according to the present invention, uneven wear was remarkably reduced.

Figure 3:
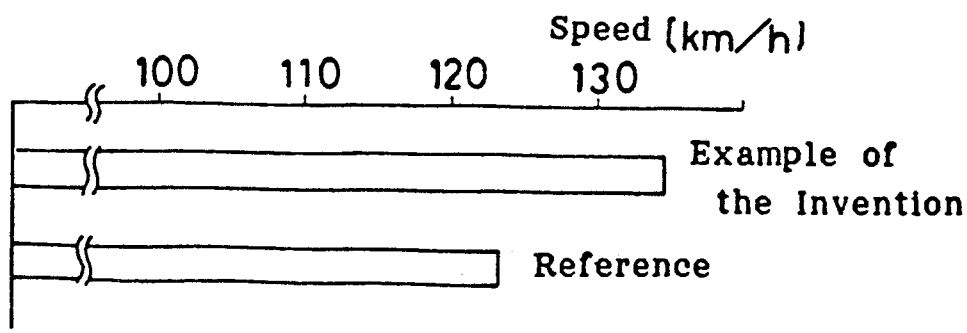
Figure 4:
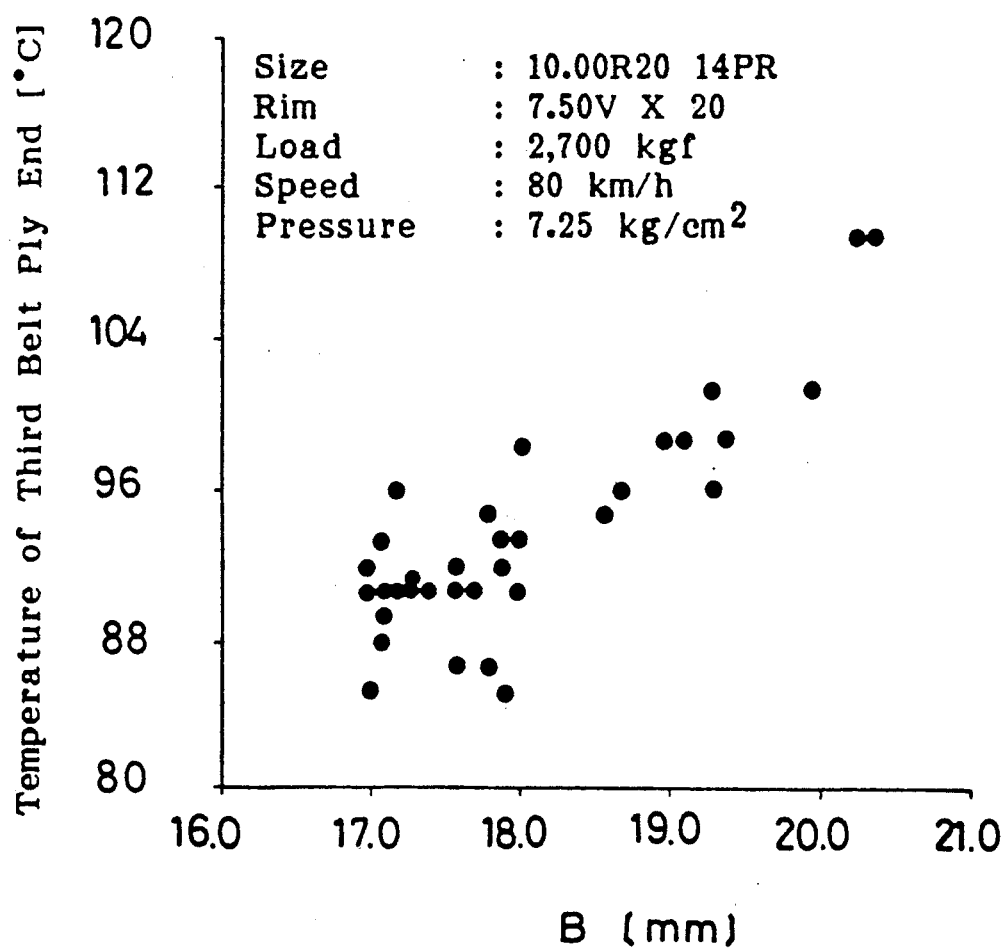
FIG. 4 is a graph showing a relationship between the temperature of the third belt ply end and its distance from the tread surface.

FIG. 3 shows results of an indoor drum test for durability on the same tires as above described, wherein the test tires were subjected to 140% of the load of the standard load and continuously run on a smooth drum with increasing the running speed to reproduce tread separation failure by the generated heat. The durability of the tire is evaluated by the running speed at which the tread separation failure happened.

Also in this durability test, the tire according to the present invention is considerably superior to the reference tire.

As described above, the pneumatic radial tire for heavy loads according to the present invention comprises the second belt ply arranged in parallel with the tread surface and the third belt ply provided in both the end parts with the spaced parts which are, in section, concentric with the tread surface, whereby the rigidity of the tread becomes uniform, and the occurrence of uneven wear is lessened.

Furthermore, as the spaced parts are covered with rubber, the stress concentration on the adjacent belt ply ends is reduced, whereby the resistance to ply separation increases and the structural failure diminished.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A radial tire, comprising:
   a carcass extending between beads of the tire, having cords arranged therein at an angle of 0 to 30 degrees with respect to a radial direction of the tire;
   a tread width (W) on said carcass, a radially outer surface thereof having a curvature with a center on the tire equator; and
   a belt disposed between said carcass and said tread, having four plies of metal cords including a first belt ply, a second belt ply, a third belt ply and a fourth belt ply which are arranged radially outwardly in that order,
   said second belt ply having a width (B2) at least 93% of said tread width (W), and having a curvature concentric with said curvature of said radially outer surface of said tread,
   said third belt having a width (B3), less than said width (Bs), including a pair of end spaced parts each having a width (b) of 5 to 15% of said width (B3) of said third belt ply, a central part between said end parts having a width (CR) or 60 to 70% of said width (B3) of said third belt ply, and a slanting part (c) disposed between said central part and each of said end parts, said central part having a curvature concentric with said curvature of said radially outer surface of said tread, and each of said slanting parts sloping upward such that a vertical distance from said second belt ply gradually increases from said central part to said end part, and said end parts each having a curvature concentric with said curvature of said radially outer surface of said tread, a distance (Y) of each end part of said third belt ply from said second belt ply being from 1.5 to 4.5 mm, said first belt ply having a width (B1) smaller than said width (B2) of said second belt ply, and said third belt ply having a width (B3) slightly smaller than said width (B1) of said first belt ply, such that the difference (B1-B3) of said width (B1) from said width (B3) is from 4 mm to 8 mm, said fourth belt ply having a width (B4) smaller than the width between the axially inner ends of said end parts of said third belt ply, said fourth belt ply being disposed on said third belt ply between said axially inner ends of the end parts of said third belt ply such that a distance (A) thereof from said radially outer surface of said tread is substantially equal to a distance (B) of each end part of said third belt ply from said radially outer surface of said tread.

2. The radial tire of claim 1, wherein said width (B4) is smaller than said width (CR) of said central part of said third belt ply.

3. The radial tire of claim 1, wherein said cords of said belt are of steel.

4. The radial tire of claim 3, wherein said distance (Y) between said end spaced parts of said third belt ply and said second belt ply is from 1.0 to 2. times the thickness of said second belt ply.

5. The radial tire of claim 4, wherein said thickness of the second belt ply is from 1.2 mm to 1.8 mm.

6. The radial tire of claim 1, wherein said belt further includes covering rubber layers covering edges of said second belt ply and edges of said third belt ply, providing said distance (Y) between said end spaced part of said third belt ply and said second belt ply.

7. The radial tire of claim 1, wherein said belt further includes covering rubber layers covering edges of said second belt ply, providing said distance (Y) between said end spaced parts of said third belt ply and said second belt ply.

8. The radial tire of claim 1, wherein said belt further includes covering rubber layers covering edges of said third belt ply, providing said distance (Y) between said end spaced part of said third belt ply and said second belt ply.

* * * * *

UNITED STATES PATENT AND TRADEMARK OFFICE
CERTIFICATE OF CORRECTION

PATENT NO. : 5,131,446

DATED : Jul. 21, 1992

INVENTOR(S) : Fukumoto et al.

It is certified that error appears in the above-identified patent and that said Letters Patent is hereby corrected as shown below:

Title page, item [63], change "Apr. 18" to --Apr. 19--

Signed and Sealed this

Thirty-first Day of August, 1993

Attest:

BRUCE LEHMAN

*Attesting Officer*  *Commissioner of Patents and Trademarks*